Patented Jan. 24, 1933

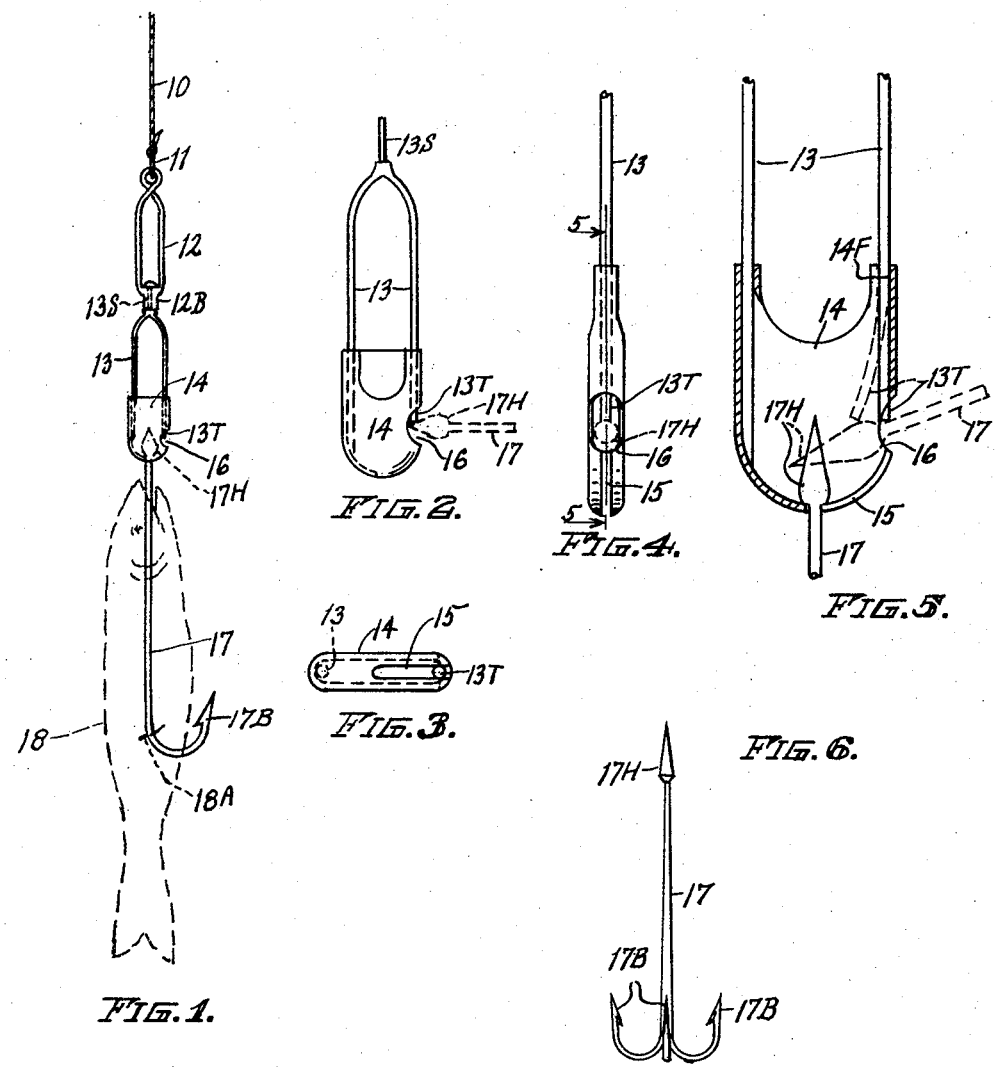

1,895,301

UNITED STATES PATENT OFFICE

CHRIS W. VANDERMARK, OF ST. PAUL, MINNESOTA

FISHHOOK AND LINK

Application filed August 12, 1931. Serial No. 556,487.

My invention relates to fishhooks and means for readily and removably engaging the same, the latter comprising a holding device connected to a fishing line. The hook proper embodies certain new and useful improvements particularly in the end opposite from the barbed point or in other words the improvement in the hook proper is in the upper shank end of the hook hitherto formed with a small loop or eyelet.

The construction, use and novelty of my device is hereinafter fully set forth, reference being had to the accompanying drawing, in which,—

Fig. 1 is a vertical elevation of the complete fishhook and holder, attached to a line, a live bait such as a minnow being shown in dotted outlines.

Fig. 2 is an enlarged elevation of a preferred type of fishhook holder comprising a part of my invention.

Fig. 3 is an enlarged lower end view of Fig. 2, and Fig. 4 is an enlarged right edge view of the lower part of Fig. 2.

Fig. 5 is a longitudinal sectional elevation of the holder member, approximately on the plane illustrated by line 5—5 in Fig. 4.

Fig. 6 is an elevation of a so-called gang hook embodying a single shank with my improved form of upper end, the lower end comprising 3 integrally formed fishhooks of the well known type.

Referring to the drawing by reference numerals, 10 represents any fishing line attached at 11 to the eye of an elongated swivel member 12, the latter having at its lower end a bearing 12B for rotatably retaining the shank 13S of a fishhook holder comprising a part of my invention and hereinafter designated as the holder.

Below the shank 13S this holder comprises a pair of parallel wires 13 formed integral with the shank 13S at their upper ends, their lower ends extending into and retained within a flat metal pocket 14. This pocket or head is hollow and flat, resembles the metal end of a safety pin which releasably holds the pointed end of such pin, but in my device has certain features presently to be described. The lower end of this pocket is of half-round form and closed except for a slit 15 extending from its extreme lower end and up one side on the curvature where it opens into an enlarged side opening 16 for insertion of the upper end of a fishhook of certain design as presently to be described. One wire 13 of the holder is fixed permanently within the holder at its upright edge opposite opening 16, the other wire is likewise inserted into the opposite edge part from the first one described and being of spring wire, bears outwardly as at 14F (Fig. 5), this wire comprising a yieldable tongue 13T within the holder and terminates in the aperture 16. Obviously the pocket 14 may be of various designs and closed or open at its upper end, preferably closed, but its lower part in all cases comprises a flat chamber with the side opening 16 and a slit 15 extending downwardly therefrom. The purpose of said opening 16 is to permit passage inwardly therethrough of the headed upper end 17H of the shank of a fishhook 17. When inserting said headed end of the fishhook, as in Fig. 5, the spring-like tongue 13T yields, as to dotted line position, until the entire head is within the holder, after which the tongue springs back to partly close the opening 16 and prevent accidental escape of the fishhook.

With the head-part 17H within the holder the shank of hook 17 is slidable freely downward in slot 15 as to full line position in Fig. 5 when the fishhook is in common plane and alinement with the holder, the hook depends freely but is retained securely from escape by the enlargement or head 17H. Said head may be of various forms but preferably is pointed as shown for the purpose of piercing or passing it readily through live or other bait. Thus the barbed end of the fishhook need not be used to pierce and mutilate the bait used.

In Fig. 1 a live minnow 18 is shown on the fishhook, the head end thereof having been inserted into the body near the tail and then directed forwardly and out of the mouth, thus concealing all but the barbed end of the hook and holding the minnow in a natural position. Other kinds of live or dead bait may be used and retained by the fishhook in many different ways as may be the choice of the person using this hook, but it is an important feature of this type of hook that the tearing or mutilation of any bait by a barb is eliminated, the pointed end 17H of the hook being used to pierce the bait.

It is also obvious that in the use of this type of hook, undersized fish or fish which may not be taken lawfully may be removed from the hook without mutilation. In this instance the hook is removed from the holder and more readily removed from a fish by pulling the shank from the barbed end.

It is now clear that my holder member is useful for hooks of various sizes, the proportions of the head 17H and the width of slit 15 and size of opening 16 being designed such that hooks of considerably variating size may be inserted or replaced at any time.

I have described the manner of inserting a hook in the device but for removing a hook it will be readily understood that the free spring arm 13 (as to the right in Fig. 5) is simply pressed inwardly until its tongue end 13T is sprung from the side opening 16 sufficiently to permit the headed part 17H to be passed through said opening outwardly.

In the modification of my fishhook Fig. 6, a so-called "gang" or multiple hook is shown having a common shank 17, the upper end of which is formed with the head 17H of spear-like appearance. In Figs. 1 and 6 the barbed end or ends of the fishhooks are designated 17B.

The head 17H is not necessarily of any particular design but in any case is preferably pointed concentric of shank 17, said head formed opposite its point in a preferably rounded shoulder where it adjoins the shank for the purpose of pivoting freely on the metal at both sides of the slit of the holder.

Preferred embodiments of structure have been illustrated and herein described, a number of modifications in details being construed as falling within the scope and spirit of my invention.

I claim:

1. A fishhook and holder therefor in which said fishhook comprises an elongated metal shank with any desired form of pointed hook means integrally formed at one end thereof, a pointed spear-like head formed integrally of the end of said shank opposite the hook end, a holder for removably engaging said head and comprising a hollow metal keeper provided with a side opening for insertion of said head and a comparatively narrow slit extending from said opening toward the one end of the keeper, a bifurcated wire member with one arm fixed in the keeper opposite said opening, the other arm extending downwardly and normally projecting into said side opening, the latter arm yieldable inwardly from the opening to permit insertion of the head part of the hook.

2. The structure specified in claim 1 in which said bifurcated arms are normally parallel and connected in spaced relation to the keeper, a swivel joint formed integrally of said bifurcated member at the junction of said arms and extending in a common plane therefrom, and a suitable connection provided with an aperture to be connected to a fishing line and bearing means for the swivel part of the bifurcated member.

3. The combination of a fishhook provided with an enlargement of its shank at the end opposite from its point, a holder for removably engaging said hook at its enlarged part and comprising a flat, hollow member rounded at one end and provided with an opening in its side for inserting said enlarged end of the hook, and provided further with a narrow slit extending from said opening to the extremity of said rounded end to permit the shank of the hook to slide freely therein, the enlarged end of the hook simultaneously to be retained within the hollow member, means fixed to said hollow member for suitably securing it to a fishing line, a yieldable spring arm retained in said hollow member and its free end normally located within said side opening to prevent accidental escape of the said headed end of the hook from the hollow member, but yieldable inwardly under pressure to permit removal and replacement of fishhooks as described.

In testimony whereof I affix my signature.

CHRIS W. VANDERMARK.